US008241009B2

(12) United States Patent
Platteel et al.

(10) Patent No.: US 8,241,009 B2
(45) Date of Patent: Aug. 14, 2012

(54) WATER MAIN SYSTEM WITH MONITORING OF ADDITION OF BRANCHES, SYSTEM AND METHOD THEREFOR

(75) Inventors: Johannes Donaes Jacobus Platteel, As Muiden (NL); Sjoerd Pieter Wouda, Ar Muiderberg (NL)

(73) Assignee: Ecoplay International B.V., Muiderberg (NL)

( * ) Notice: Subject to any disclaimer, the term of this patent is extended or adjusted under 35 U.S.C. 154(b) by 762 days.

(21) Appl. No.: 12/224,643

(22) PCT Filed: Mar. 2, 2007

(86) PCT No.: PCT/NL2007/000056
§ 371 (c)(1),
(2), (4) Date: Sep. 2, 2008

(87) PCT Pub. No.: WO2007/100244
PCT Pub. Date: Sep. 7, 2007

(65) Prior Publication Data
US 2009/0065062 A1    Mar. 12, 2009

(30) Foreign Application Priority Data
Mar. 2, 2006    (NL) .................................. 1031270

(51) Int. Cl.
*F04B 49/00*    (2006.01)
*G08B 1/08*    (2006.01)
*G05D 9/12*    (2006.01)
*B67D 7/08*    (2010.01)
*B67D 7/32*    (2010.01)

(52) U.S. Cl. ..... 417/63; 417/278; 137/392; 137/565.16; 340/605; 340/635

(58) Field of Classification Search ................. 417/44.1, 417/53, 63, 278, 44.11; 137/68.18, 554, 137/565.16, 551, 392; 340/524, 605, 635, 340/657
See application file for complete search history.

(56) References Cited

U.S. PATENT DOCUMENTS

| 4,874,015 | A  | * | 10/1989 | Schirmacher | 137/637.05 |
| 6,897,784 | B2 | * | 5/2005  | Goehlich    | 340/635    |
| 6,935,160 | B2 | * | 8/2005  | Hong et al. | 340/605    |
| 7,032,435 | B2 | * | 4/2006  | Hassenflug  | 340/605    |

FOREIGN PATENT DOCUMENTS

| DE | 3930530 A1 | * | 3/1991 |
| SU | 1712736 A1 |   | 2/1992 |

* cited by examiner

*Primary Examiner* — Mariceli Santiago
(74) *Attorney, Agent, or Firm* — The Webb Law Firm

(57) ABSTRACT

The present invention relates to a system for reusing water, comprising: —a mains system which comprises at least one conduit for transporting water and monitoring means adapted to measure changes in an electrical parameter of the conduit; —a storage tank for storing supplied water; —a water discharge for discharging stored water to a water-consuming unit; and—a control system adapted to control the supply of water to and the discharge of water from the storage tank subject to the changes in the parameter measured by the monitoring means. The present invention also relates to a mains system applied in such a system, and to a method for monitoring such a system or water mains system.

26 Claims, 2 Drawing Sheets

WATER MAIN SYSTEM WITH MONITORING OF ADDITION OF BRANCHES, SYSTEM AND METHOD THEREFOR

The present invention relates to a mains system for water with monitoring of addition of branches. The invention also relates to a system for reusing water comprising such a mains system, and a method for monitoring the addition of branches to a mains system.

In order to spare the environment regular efforts are made to reduce the use of purified mains water for water use where this high level of purity is not required. Systems can be envisaged here which reuse shower and bath water to flush a toilet. Such systems are also referred to as greywater systems. Another example are new property developments where the residential locations are provided with two separate mains systems: one for pure mains water which can be drunk from the tap and another supplying less pure water, for instance for toilet use.

When a conduit with for instance shower water, bath water, rainwater or other water not meeting quality standards for drinking comes into contact with the drinking water mains system, contamination of the pure mains water can occur, with the consequence of serious public health hazards.

It is therefore desirable to be able to monitor water conduits in the situation where conduits transporting impure water come into contact with the mains system for the transport of drinking water. There is a real danger of such an undesirable connection between different water mains systems coming about by mistake when work is done by an inexperienced DIY enthusiast. The lack of standardization for water conduits further increases the risk of mistakes.

An object of the present invention is to provide a mains system wherein the risk of a connection occurring between a conduit for transporting impure water and a conduit for transporting drinking water is reduced.

Said object is achieved with the mains water system according to the invention, wherein a mains system for water comprises at least one conduit for transporting water and monitoring means for monitoring whether the conduit is branched.

In order to create a connection between two mains water systems it will be necessary for branches and connections to be arranged. Because it is possible in the mains system according to the invention to detect when a branch is arranged in a conduit, there is also detected whether a risk of contact results, i.e. whether the condition is met that a branch has been made in the mains system. Branching of a mains system in which water is transported which is non-drinkable, i.e. can cause a health hazard when consumed, must—if it is necessary—take place extremely carefully. In order to ensure that only qualified tradespeople can carry out such work it is desirable to monitor such mains systems for transporting 'impure' water for the arranging of branches.

In a further preferred embodiment the conduit of the mains system comprises an electrically conductive member, and the monitoring means comprise a generator for generating an electrical signal, this generator being connected to the electrically conductive member, and a measuring unit for measuring at least one electrical parameter of the electrically conductive member.

By providing the conduit with an electrically conductive member, and providing this member with a signal generated by a generator, a signal results which can be measured for the purpose of monitoring the mains system. When modifications are made to the conduit, such as for instance arranging a branch, the conduit will—generally—be temporarily separated. Even when the conduit is not wholly separated, modifications to the mains system can result in changes in the measuring signal, such as is for instance the case when the electrical resistance of the conduit is measured. The value of the signal generated by the generator measured by the measuring unit will change due to modifications to the conduit. In this manner modifications to the mains system, such as the arranging of branches, can be detected.

In a preferred embodiment the electrically conductive member substantially comprises an electrically conductive sheath. Such an electrically conductive sheath can be accommodated in the conduit wall. Embodiments can thus be envisaged where such a sheath is situated between two electrically insulating layers. Another practical embodiment is the use of an electrically conductive tube, such as for instance a standard copper or aluminum tube, which is only provided on the outside with an insulating outer layer.

In a further preferred embodiment the electrically conductive member substantially comprises an electrically conductive wire. Such a wire can be arranged both internally and externally in the conduit. It is moreover possible for such a wire to be embedded in the wall of the conduit.

In a further embodiment the electrically conductive member is manufactured from an electrically conductive material such as aluminum, copper, zinc or electrically conductive plastic or epoxy. All materials which are electrically conductive can be used for this purpose.

In a further preferred embodiment the conduit with the electrically conductive member is part of an electrical circuit. This circuit can then be monitored for the occurrence of separations. In a further preferred embodiment the measuring unit measures whether an electrical circuit is closed.

In yet another preferred embodiment the electrical parameter which is measured comprises a difference in voltage and/or magnitude of the current and/or electrical resistance and/or impedance and/or capacity and/or induction. These electrical parameters will vary when modifications are made to the conduit, such as temporary separation of the conduit for the purpose of arranging a branch. It is of course also possible to measure these parameters in combination.

In a further preferred embodiment the measuring unit gives an acoustic and/or visual alarm as soon as a predetermined limit value of the measured electrical parameter is exceeded. Giving such an alarm can indicate that a branch is being arranged or that a situation has occurred, such as the conduit being temporarily separated, which can suggest that a branch is being arranged. It is thus possible for instance to alert the water company.

The invention further relates to a system for reusing water, comprising:
- a mains system as described above;
- a storage tank for storing supplied water;
- a water discharge for discharging stored water to a water-consuming unit; and
- a control system for controlling the supply and discharge of the water to and from the storage tank.

Systems which reuse water, such as for instance shower or bath water, for instance to flush a toilet, represent a particular risk—due to the presence of 'impure' water conduits—of undesirable connections to the mains system for drinking water. For this reason the invention further relates to such a system for reusing water, often also referred to as greywater systems, wherein the mains system as described above is applied.

In a further preferred embodiment the control system influences the water discharge from the storage tank as soon as a predetermined limit value of the electrical parameter measured by the measuring unit is exceeded. As a result of this influence in such a risky situation characterized by the electrical parameter having exceeded a limit value, the water discharge of water intended for reuse can be temporarily or permanently stopped.

In another further preferred embodiment the influencing of the water discharge comprises of switching off a pump and/or closing a conduit with a closing member. In this way it is possible—if a branch with a possible connection to another mains system is arranged—to prevent water intended for reuse entering the mains system for transporting drinking water, with the result of possible contamination.

In yet another preferred embodiment the system for reusing water comprises a pump for pumping water from the storage tank to a water-consuming unit, wherein the control system switches off this pump when a predetermined maximum water delivery is exceeded.

When the maximum water consumption of a water-consuming unit in a determined period is known, this can also be used to trace branches. If the volume of the cistern of a toilet is known, a maximum delivery to be supplied by the pump can be determined. Arranging of branches results in the possibility of the water demand increasing to a point above this delivery, which can for instance be measured by for instance a flow meter. In cases where the demanded delivery exceeds the maximum delivery which can be anticipated for the relevant water-consuming unit, this may indicate the presence of a branch. In such cases the transport of water intended for reuse can be limited or wholly prevented by temporarily or permanently switching off the pump.

The flow meter will also detect an increased water requirement if a possible branch is arranged not in the mains system but in the reservoir of a water-consuming unit.

The invention further relates to a method for monitoring of addition of branches to a water mains system, comprising the steps of arranging at least one conduit for transporting water and monitoring this conduit for the addition of branches.

In a preferred embodiment of this method the conduit comprises an electrically conductive member, and the method further comprises the steps of generating an electrical signal with a generator connected to the electrically conductive member, and measuring at least one electrical parameter of the electrically conductive member.

In another further preferred embodiment the method further comprises the steps of comparing the measured value of the electrical parameter to a predetermined limit value and giving an acoustic and/or visual alarm and/or closing the conduit with a closing member when the measured value exceeds the predetermined limit value.

In a further preferred embodiment the electrical signal is generated and measured continuously. In this manner it is possible to immediately detect modifications to the mains system.

In yet another further preferred embodiment the electrical signal is generated and measured periodically. The period of time between two measurements is preferably so short that it is impossible during this time period to temporarily separate the conduit, arrange a branch and reconnect. A practical time period is therefore for instance a maximum of one minute.

An exemplary embodiment is further elucidated in the following description with reference to the drawing, in which.

Figure 1:
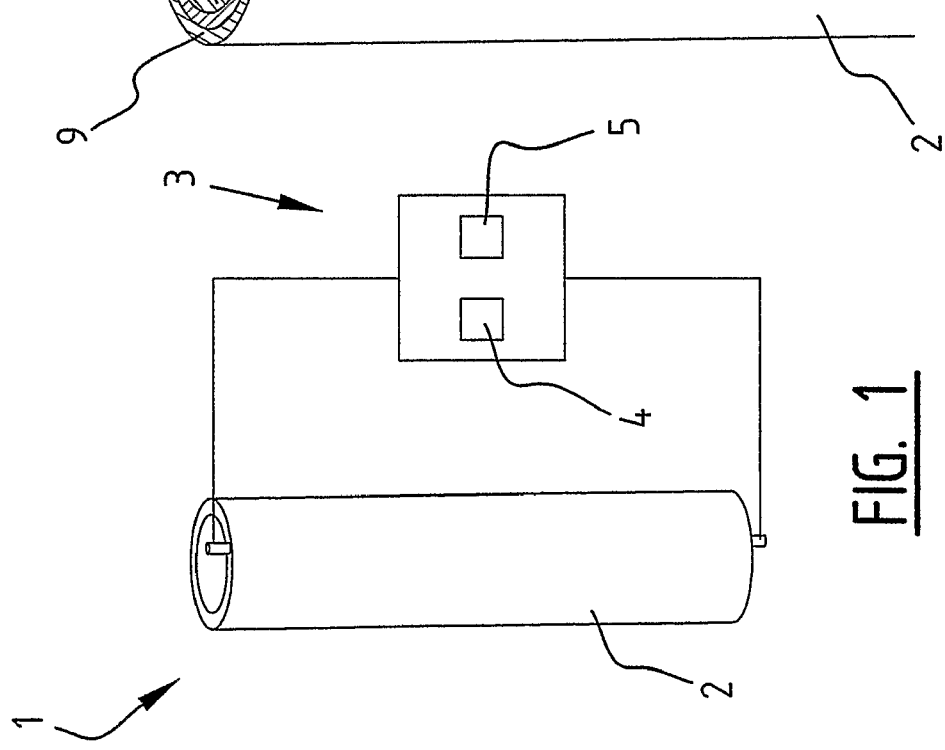
FIG. 1 shows an outline diagram of a mains system according to the invention.

FIG. 1 shows a mains system 1 comprising a conduit 2 and monitoring means 3 connecting thereto for monitoring whether conduit 2 is being branched.

In a preferred embodiment monitoring means 3 comprise a generator 4 for generating a measuring signal and a measuring unit 5 for measuring this measuring signal. Conduit 2 comprises an electrically conductive member 6 which can be embodied as an electrically conductive sheath 7 or electrically conductive wire 10.

Figure 2:
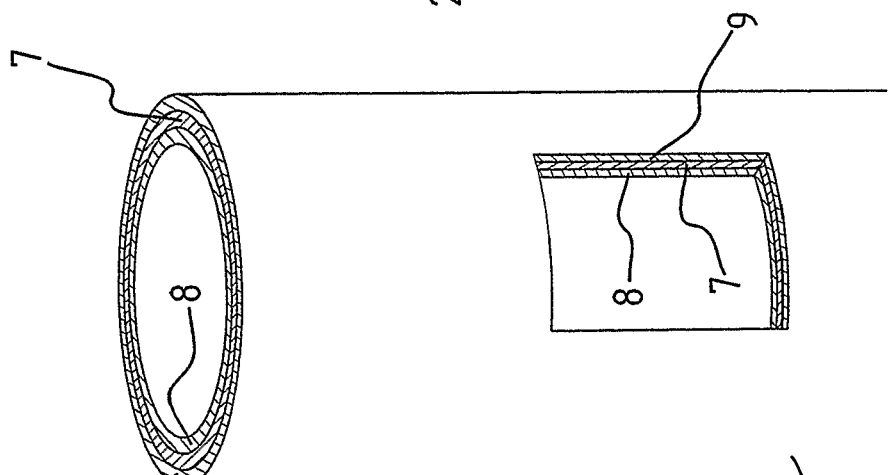
FIG. 2 shows a conduit according to a first preferred embodiment of the invention.

FIG. 2 shows a preferred embodiment of conduit 2 in which the electrically conductive member is an electrically conductive sheath 7. This sheath 7 is shielded on the inner side by an insulating inner layer 8 and on the outside by an insulating outer layer 9. Embodiments can also be envisaged wherein sheath 7 has only an electrically insulating outer layer 9.

Figure 3:
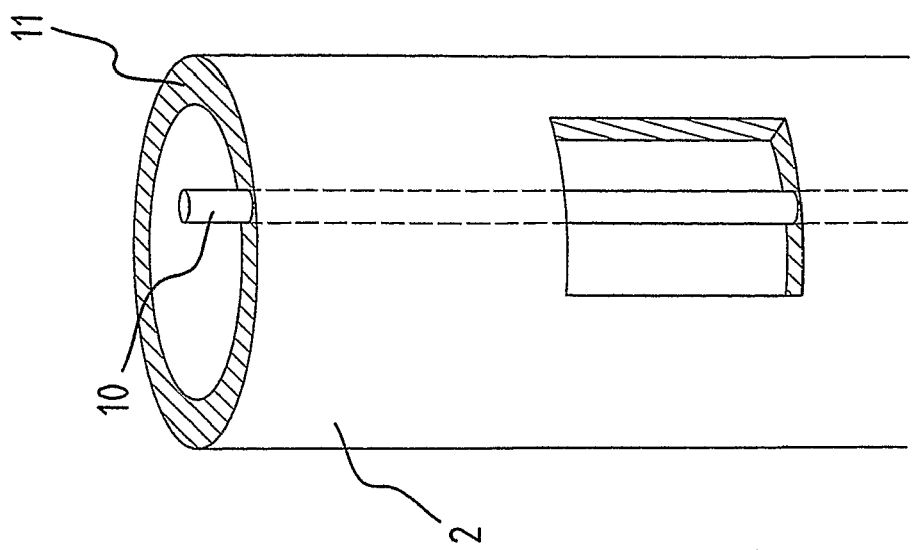
FIG. 3 shows a conduit according to a second preferred embodiment of the invention.

FIG. 3 shows an alternative embodiment in which the electrically conductive member is an electrically conductive wire 10. In the shown embodiment wire 10 is embedded in an electrically insulated conduit wall 11, although it is also possible to arrange this wire 10 internally or externally relative to conduit 2.

Figure 4:
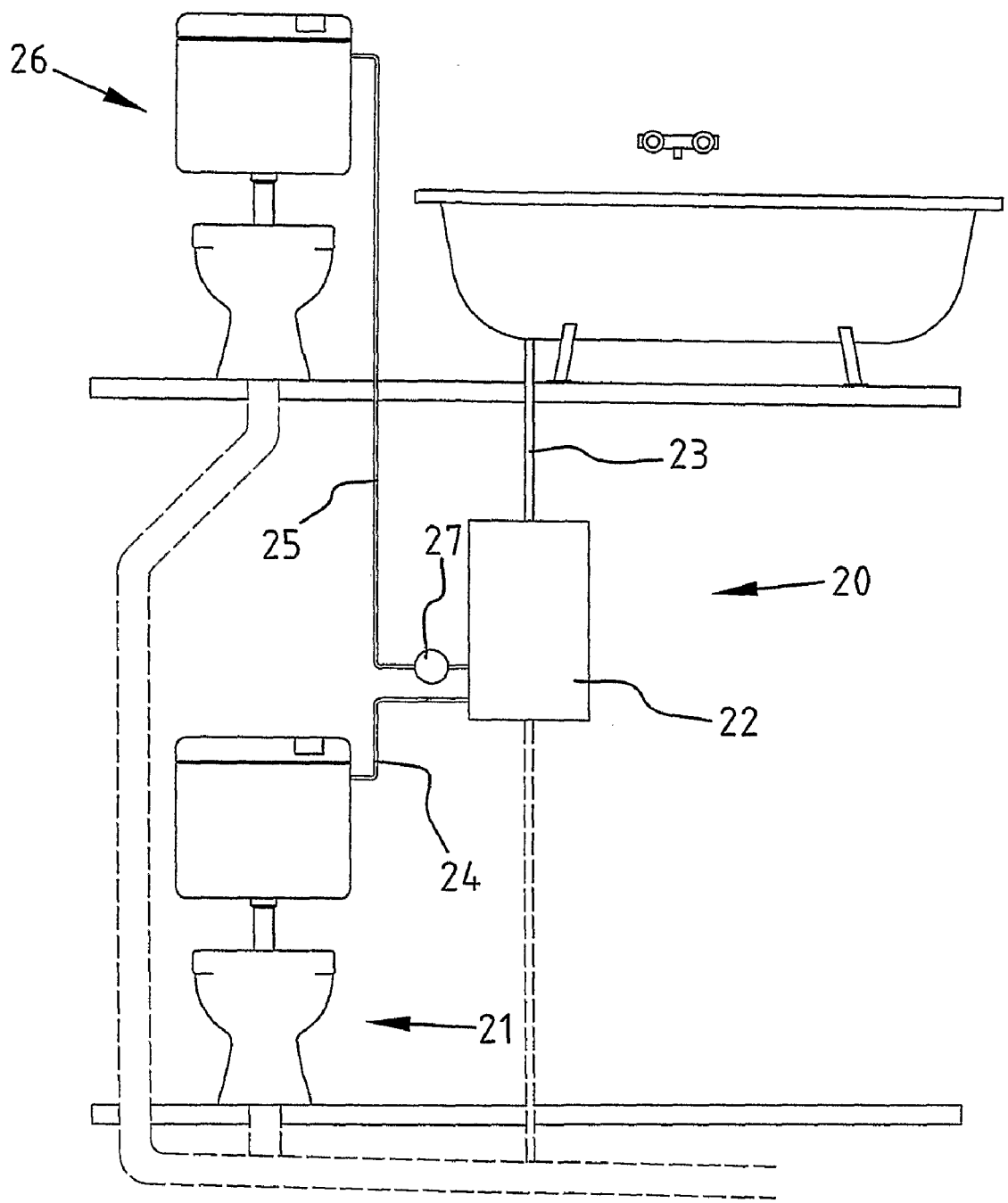
FIG. 4 shows a system for reusing water provided with the mains system according to the invention.

FIG. 4 shows a system for reusing water, such as for instance shower or bath water used for flushing a toilet. The shower and bath water is supplied via a supply conduit 23 and stored in a storage tank 22. If a water-consuming unit such as a toilet 21 requires water for flushing thereof, this water is transported via a discharge conduit 24 from storage tank 22 to toilet 21.

It is possible via a water conduit 25 to also supply a second—remotely located—water-consuming unit in the form of a second toilet 26 with water from storage tank 22. If the distance from the storage tank is great, and certainly in the case where the second water-consuming unit is a toilet 26 on a higher floor, it will be necessary to arrange a pump 27 in water conduit 25 in order to pump the water from storage tank 22 via conduit 25 to toilet 26. Pump 27 provides a pressure in water conduit 25, which also makes this conduit suitable for other applications—which are undesirable in view of the nature of the water transported thereby—such as for instance branching and providing with a tap and so on. Water conduit 25 in particular will therefore have to be monitored for the addition of branches, and will therefore comprise the mains system according to the invention.

It is of course recommended to monitor all conduits leaving the system for reuse of water for the addition of branches. In this example these are the conduits 24 and 25.

Although they are preferred embodiments of the invention, the above described embodiments are intended only to illustrate the present invention and not in any way to limit the specification of the invention. The scope of the invention is therefore defined solely by the following claims.

What is claimed is:

1. A system for reusing water, comprising:
   a mains system which comprises at least one conduit for transporting water having an electrically conductive member capable of producing an electrical parameter, and monitoring means adapted to receive and measure the electrical parameter of the conduit;
   a storage tank for storing supplied water;
   a water discharge for discharging stored water to a water-consuming unit; and
   a control system adapted to control the supply of water to and the discharge of water from the storage tank subject to the changes in the parameter measured by the monitoring means, wherein the electrical parameter indicates the addition of at least one branch to the mains system, and wherein the control system influences the water discharge from the storage tank as soon as a predetermined limit value of the electrical parameter measured by the monitoring means is exceeded.

2. The system of claim 1, wherein the control system is adapted to switch off a pump subject to a signal received from the monitoring means, the pump being adapted to pump water from the storage tank to the water-consuming unit.

3. The system of claim 1 or 2, wherein the control system is adapted to close a closing member arranged in the conduit subject to a signal received from the monitoring means.

4. The system of claim 1, wherein the conduit comprises an electrically conductive member, and the monitoring means comprises:
   a generator for generating an electrical signal, this generator being connected to the electrically conductive member; and
   a measuring unit for measuring at least one electrical parameter of the electrically conductive member.

5. The system of claim 4, wherein the electrically conductive member comprises an electrically conductive sheath.

6. The system of claim 4, wherein the electrically conductive member comprises an electrically conductive wire.

7. The system of claim 4, wherein the electrically conductive member is manufactured from an electrically conductive material comprising aluminum, copper, stainless steel, zinc or electrically conductive plastic or epoxy.

8. The system of claim 4, wherein the conduit with the electrically conductive member is part of an electrical circuit.

9. The system of claim 4, wherein the measuring unit measures whether an electrical circuit is closed.

10. The system of claim 1, wherein the electrical parameter comprises a difference in at least one of voltage, magnitude of the current, electrical resistance, impedance, capacity or induction.

11. The system of claim 1, wherein the control system generates an acoustic or visual alarm as soon as a predetermined limit value of the measured electrical parameter is exceeded.

12. The system of claim 1, wherein the monitoring means generate an acoustic or visual alarm as soon as a predetermined limit value of the measured electrical parameter is exceeded.

13. The system of claim 4, wherein the measuring unit generates an acoustic or visual alarm as soon as a predetermined limit value of the measured electrical parameter is exceeded.

14. The system of claim 1, wherein the control system influences the water discharge from the storage tank when a predetermined limit value of the electrical parameter measured by the measuring unit is exceeded.

15. The system of claim 1, further comprising:
   a pump for pumping water from the storage tank to a water-consumer, wherein the control system switches off the pump when a predetermined maximum water delivery is exceeded.

16. A mains system for water, comprising:
   at least one conduit for transporting water, the conduit having an electrically conductive member capable of producing an electrical parameter;
   a device connected to the conduit for reusing water, wherein the device comprises at least one storage tank;
   monitoring means adapted to receive and measure the electrical parameter of the conduit; and
   a control system adapted to control the supply of water to and the discharge of water from the storage tank subject to a signal received from the monitoring means, wherein the electrical parameter indicates the addition of at least one branch to the mains system, and wherein the control system influences the water discharge from the storage tank as soon as a predetermined limit value of the electrical parameter measured by the monitoring means is exceeded.

17. The mains system of claim 16, wherein the control system is adapted to switch off a pump subject to a signal received from the monitoring means.

18. The mains system of claim 16 or 17, wherein the control system is adapted to close a closing member arranged in the conduit subject to a signal received from the monitoring means.

19. A method for monitoring a water mains system connected to a greywater device, comprising the steps of:
   arranging at least one conduit for transporting water, the conduit having an electrically conductive member capable of producing an electrical parameter;
   arranging monitoring means adapted to monitor the conduit to receive and measure the electrical parameter to indicate the addition of at least one branch to the mains system; and
   influencing water discharge from a storage tank as soon as a predetermined limit value of the electrical parameter measured by the monitoring means is exceeded.

20. The method of claim 19, wherein the monitoring means are adapted to measure at least one electrical parameter of the conduit; and the method comprises the step of controlling with a control system the supply of water to and the discharge of water from a storage tank of the greywater device subject to the electrical parameter measured by the monitoring means.

21. The method of claim 20, further comprising:
   the step of switching off a pump with the control system subject to a signal received from the monitoring means, the pump being adapted to at least pump water from the storage tank to a water-consuming unit connected via the water mains system to the greywater device.

22. The method of claim 20, further comprising:
   the step of closing a closing member arranged in the conduit with the control system subject to a signal received from the monitoring means.

23. The method of claim 19, wherein the conduit comprises an electrically conductive member, and the method further comprises the steps of:
   generating an electrical signal with a generator connected to the electrically conductive member; and
   measuring at least one electrical parameter of the electrically conductive member.

24. The method of claim 20, further comprising the steps of:
   comparing the measured value of the electrical parameter to a predetermined limit value; and
   giving an acoustic and/or visual alarm and/or closing the conduit with a closing member when the measured value exceeds the predetermined limit value.

25. The method of claim 23, wherein the electrical signal is generated and measured continuously.

26. The method of claim 23, wherein the electrical signal is generated and measured periodically.

* * * * *